United States Patent
Chiu et al.

(10) Patent No.: US 8,355,186 B2
(45) Date of Patent: Jan. 15, 2013

(54) SYSTEMS AND METHODS FOR INTERACTIVE SEMI-AUTOMATIC DOCUMENT SCANNING

(75) Inventors: Patrick Chiu, Menlo Park, CA (US); Trista Chen, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1011 days.

(21) Appl. No.: 12/378,098

(22) Filed: Feb. 10, 2009

(65) Prior Publication Data

US 2010/0202026 A1    Aug. 12, 2010

(51) Int. Cl.
*H04N 1/047* (2006.01)
(52) U.S. Cl. ........... 358/488; 348/61; 358/1.1; 358/1.15
(58) Field of Classification Search ................. 358/1.15, 358/1.9, 488; 348/61; 382/100, 284
See application file for complete search history.

(56) References Cited

U.S. PATENT DOCUMENTS

| | | | |
|---|---|---|---|
| 5,528,290 A | 6/1996 | Saund | |
| 7,046,401 B2 * | 5/2006 | Dufaux et al. | 358/450 |
| 2005/0143136 A1 * | 6/2005 | Lev et al. | 455/566 |

OTHER PUBLICATIONS

B. Bascle et al., "Motion Deblurring and Super-Resolution from an Image Sequence", 4th European Conference on Computer Vision 1996, pp. 573-582, 1996.
M.J. Black et al., "The Digital Office: Overview", AAAI Spring Symposium on Intelligent Environments, 1998.
Canon, Inc., http://www.canon.com, retrieved on Feb. 10, 2009.
Casio, Inc., http://exilim.casio.com, retrieved on Feb. 10, 2009.
J.B. Colombe et al., "Super-resolution of video sequences using local motion estimates", Applied Imagery Pattern Recognition Workshop 2007 (AIPR '07), pp. 95-100, 2007.
S. Dai et al., "Motion from blur", Proceedings of CVPR '08, 2008.
Z.A. Ivanovski et al., "A motion-augmented super-resolution scheme for very low-bit-rate video enhancement", Proceedings of ICASSP '05, pp. 613-616, 2005.
J. Liang et al., "Camera-based analysis of text and documents: a survey", Intl. Journal on Document Analysis and Recognition, 7(2+3): 83-104, Jul. 2005.
W. Newman et al., "CamWorks: a video-based tool for efficient capture from paper source documents", Proc. Intl. Conf. on Multimedia Computing and Systems (ICMS '99), pp. 647-653, 1999.
S.C. Park et al., "Super-resolution image reconstruction: a technical overview", IEEE Signal Processing Magazine, 20(3): 21-36, May 2003.
ScanR, Inc., http://www.scanr.com, retrieved on Feb. 10, 2009.

(Continued)

*Primary Examiner* — King Poon
*Assistant Examiner* — Iriana Cruz
(74) *Attorney, Agent, or Firm* — Sughrue Mion, PLLC

(57) ABSTRACT

A semi-automatic system for scanning a document includes an image capture device, such as a digital or video camera, which records a sequence of images while a user waves a document in front of the device. The user can present multiple pages of a document to the image capture device, after which the total sequence of images are processed to identify a clear image of each page from the sequence of images. The system further includes image processing techniques to correct for motion blurring, acceleration and perspective errors. The system is capable of processing any size or shape of document without destroying the organization or format of the original.

18 Claims, 14 Drawing Sheets
(9 of 14 Drawing Sheet(s) Filed in Color)

OTHER PUBLICATIONS

M. Taylor et al., "Enhancement of Document Images from Cameras", In SPIE Conference on Document Recognition V, 3305, pp. 230-241, 1998.

Visioneer, Inc., http://www.visioneer.com, retrieved on Feb. 10, 2009.

Xerox Corp., http://www.xerox.com, retrieved on Feb. 10, 2009.

* cited by examiner

SYSTEMS AND METHODS FOR INTERACTIVE SEMI-AUTOMATIC DOCUMENT SCANNING

BACKGROUND OF THE INVENTION

1. Field of the Invention

The present invention relates to systems and methods for interactive semi-automatic document scanning, and, more specifically, to using an image capture device to record a sequence of images as a user passes a document in front of the image capture device, after which the images are processed to provide an accurate digital image of the document.

2. Background of the Invention

Traditional ways of scanning documents on common systems can sometimes be tedious and cumbersome, and alternative systems and practices based on digital-cameras have been developed over the years. However, most of these systems still require the user to go back and forth between manipulating the document pages and operating the system.

Currently there are several kinds of scanners on the market for the office and home. There are large office scanners/printers (e.g. Xerox DocuColor, Xerox Corp., http://www.xerox.com (link visited Jul. 17, 2008)) that are hi-quality, expensive, and take up floor space. There are home and home-office scanners/printers (e.g. Canon PIXMA, Canon, Inc., http://www.canon.com (link visited Jul. 17, 2008)) that are low cost and can handle limited types of scanning tasks. There are mobile scanners (e.g. Visioneer Roadwarrior, Visioneer, Inc. http://www.visioneer.com (link visited Jul. 17, 2008)) that are convenient for scanning a few sheets of paper at a time.

In terms of handling the documents during the scanning process, these kinds of scanners have problems that can use improvement. The large office scanners and some home office scanners have automatic document feeders to handle multi-page and duplex documents. However, the document must be manually disassembled (e.g. remove staples) and perhaps reassembled after scanning. The document paper must be in good shape to avoid paper jams, which may not be true for some old documents. It is difficult to scan books and manuals. Scanning business items can be difficult or tedious: receipts, business cards, appointment books. Similar problems can occur for scanning personal items: notebook pages, letters, greeting cards, children's artwork, etc.

For mobile scanners, the document handling system is even more limited, as the page must fit through a narrow slit one at a time, not to mention the speed and quality limitations of mobile scanners compared to office scanners.

Given these difficulties, people have developed workarounds and other ways to scan and digitize their paper documents. One popular method is to use a digital camera to take photos of their documents. There are even businesses to support this practice (e.g. ScanR, ScanR, Inc., http://www.scanr.com (link visited 2008-07-17)). While this works well for digitizing a few documents here and there, it can be tedious with larger batches of documents because the user has to go back-and-forth between changing the document pages and operating the camera.

Thus, it is desired to develop methods for scanning a wide variety of document types at a rapid rate in a cost-effective manner.

SUMMARY OF THE INVENTION

The present invention relates to systems and methods for interactive, semi-automatic scanning of a document using an image capture device and image processing, wherein the image capture device, such as a digital or video camera, records a sequence of images as a user waves a page of the document in front of the image capture device. A sub-sequence of images is recorded for each page presented to the image capture device by the user, after which an image processor performs a motion-based image analysis including page detection and image enhancement.

In one aspect, the present invention relates to a system for scanning a document, the system comprising an image capture device configured to record a sequence of images of at least one page of the document as a user passes the at least one page in front of the image capture device; and an image processor embodied on a computer with a processor and a memory that receives the recorded sequence of images and detects a sub-sequence of images for each page of the document, wherein the image processor selects a preferable image of each page from each sub-sequence of images to create a digital copy of the document.

In another aspect of the invention, the image processor selects the preferable image of each page from the sub-sequence of images by finding the image based on the image boundary pixels matching the background and determining corner points of the page.

In a further aspect of the invention, the image processor is further configured to perform perspective correction on the preferable image of each page of the document.

In still another aspect of the invention, the image processor is further configured to crop and rotate the preferable image of each page of the document.

In a yet further aspect of the invention, the system further comprises a color background board for the image capture device to point at while the sequence of images of the document are being recorded.

In another aspect of the invention, the image processor is further configured to perform image deblurring on the preferable image from each page of the document.

In a further aspect of the invention, the image processor is further configured to perform image cleanup on the preferable image from each page of the document.

The present invention also relates to methods of scanning a document, comprising the steps of recording a sequence of images of at least one page of the document as a user passes the at least one page in front of an image capture device; detecting a sub-sequence of images for each page of the document; selecting the preferable image of each page of the document from the sub-sequence of images; and creating a digital copy of the document by combining the preferable image of each page of the document into a single digital document.

In another aspect of the invention, the method further comprises performing page edge detection on each image in the sub-sequence of images in order to determine the preferable image of each page of the document.

In a further aspect of the invention, the method further comprises performing perspective correction on the preferable image of each page of the document.

In still another aspect of the invention, the method further comprises cropping and rotating the preferable image of each page of the document.

In a yet further aspect of the invention, the method further comprises providing a color background board for the image capture device to point at while the sequence of images of the document are being recorded.

In another aspect of the invention, the method further comprises performing image deblurring on the preferable image from each page of the document.

In still another aspect of the invention, the method further comprises performing image cleanup on the preferable image from each page of the document.

The present invention also relates to methods of image enhancement of a scanned image, comprising the steps of receiving a sequence of scanned images of an object that has been blurred by motion during scanning; detecting edge features of at least two images in the sequence to determine the estimated motion of the object between the images; receiving the burst rate of an image capture device that performed the scanning; receiving the shutter-speed of the image capture device that performed the scanning; estimating the motion blur of at least one scanned image using the estimated motion, the burst rate and the shutter speed, wherein the motion blur is calculated as a width of pixel-blur; and enhancing at least one image of the object by using the width of pixel blur to correct the object position in the image and eliminate the blurring in the image.

In another aspect of the invention, the method further comprises estimating motion acceleration of the object between images by determining the estimated motion of the object between at least three images in the sequence of images.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The patent or application file contains at least one drawing executed in color. Copies of this patent or patent application publication with color drawings will be provided by the Office upon request and payment of the necessary fee.

The accompanying drawings, which are incorporated in and constitute a part of this specification exemplify the embodiments of the present invention and, together with the description, serve to explain and illustrate principles of the inventive technique. Specifically.

DETAILED DESCRIPTION OF THE INVENTION

In the following detailed description, reference will be made to the accompanying drawing(s), in which identical functional elements are designated with like numerals. The aforementioned accompanying drawings show by way of illustration and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of software running on a general purpose computer, in the form of a specialized hardware, or combination of software and hardware.

The present invention relates to systems and methods for interactive, semi-automatic scanning of a document using an image capture device and image processing, wherein the image capture device, such as a digital or video camera, records a sequence of images as a user waves a page of the document in front of the image capture device. A sequence of images is recorded for each page presented to the image capture device by the user, after which an image processor detects a sub-sequence of images for each page of the document and selects the best image of each page from the subsequence of images. The image processor uses additional algorithms to perform page detection, reconstruction and enhancement.

In one embodiment, the system is interactive and semi-automatic: the user simply waves each document page (or object) in front of a video camera and a fixed color background area, and the system uses the sequence of recorded images to reconstruct a corrected and enhanced image of the page.

In terms of system design and cost, the inventive system is much simpler and less costly to produce because there are fewer electromechanical parts than traditional scanners. Furthermore, these mechanisms have to be precisely manufactured to produce good quality results. In comparison, the inventive system places the complexity in the software for processing and computing the document page images.

In terms of handling the documents, the system enables more efficient workflow than taking photos of document pages one at a time with a digital camera. It facilitates fluid user interaction, and supports many types of document form factors.

Image Capture and Analysis

Figure 1:
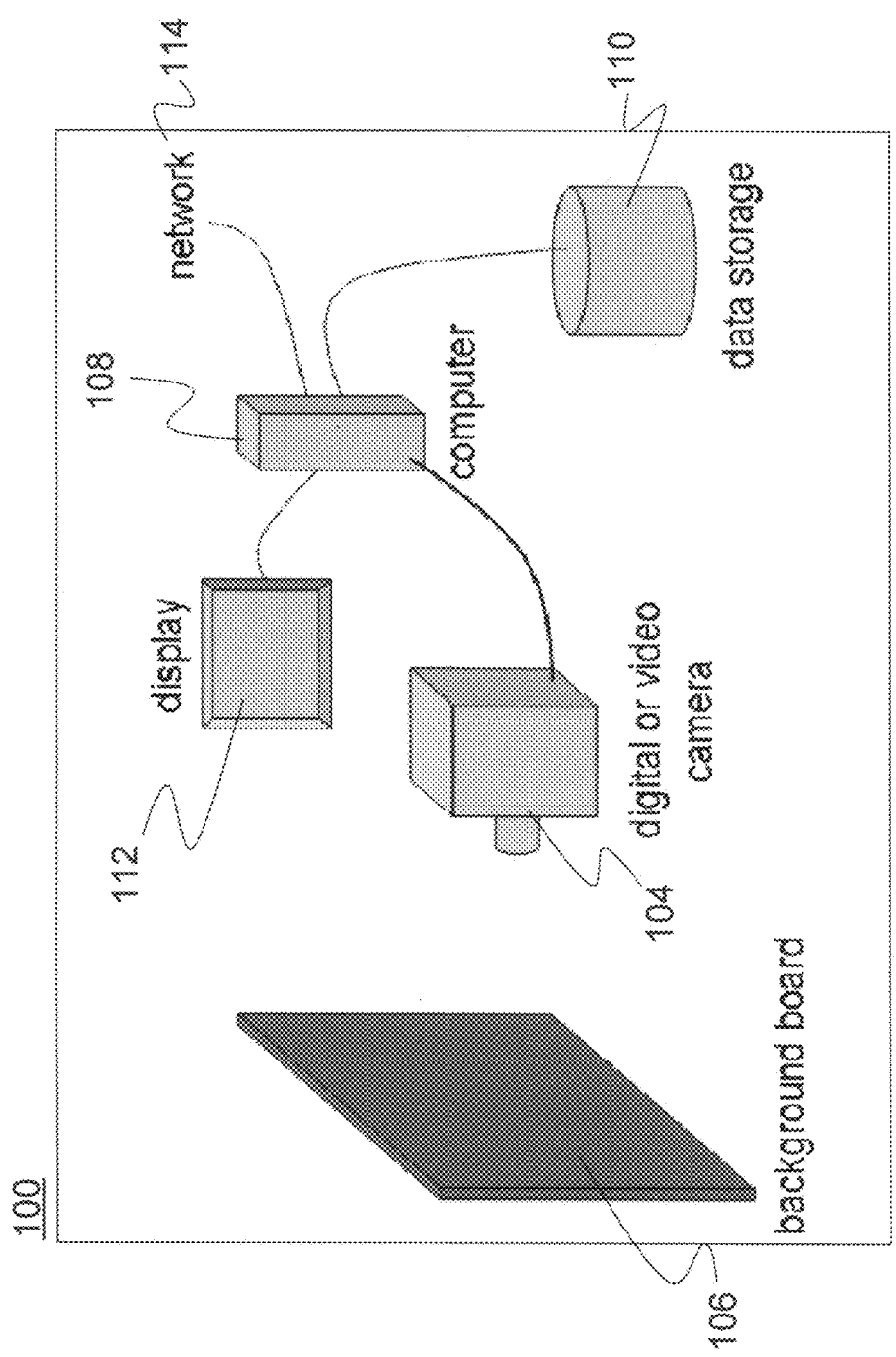
FIG. 1 depicts a system for interactive, semi-automatic document scanning including an image capture device and a computer with an image processor and memory, according to one embodiment of the invention.
Figure 2:
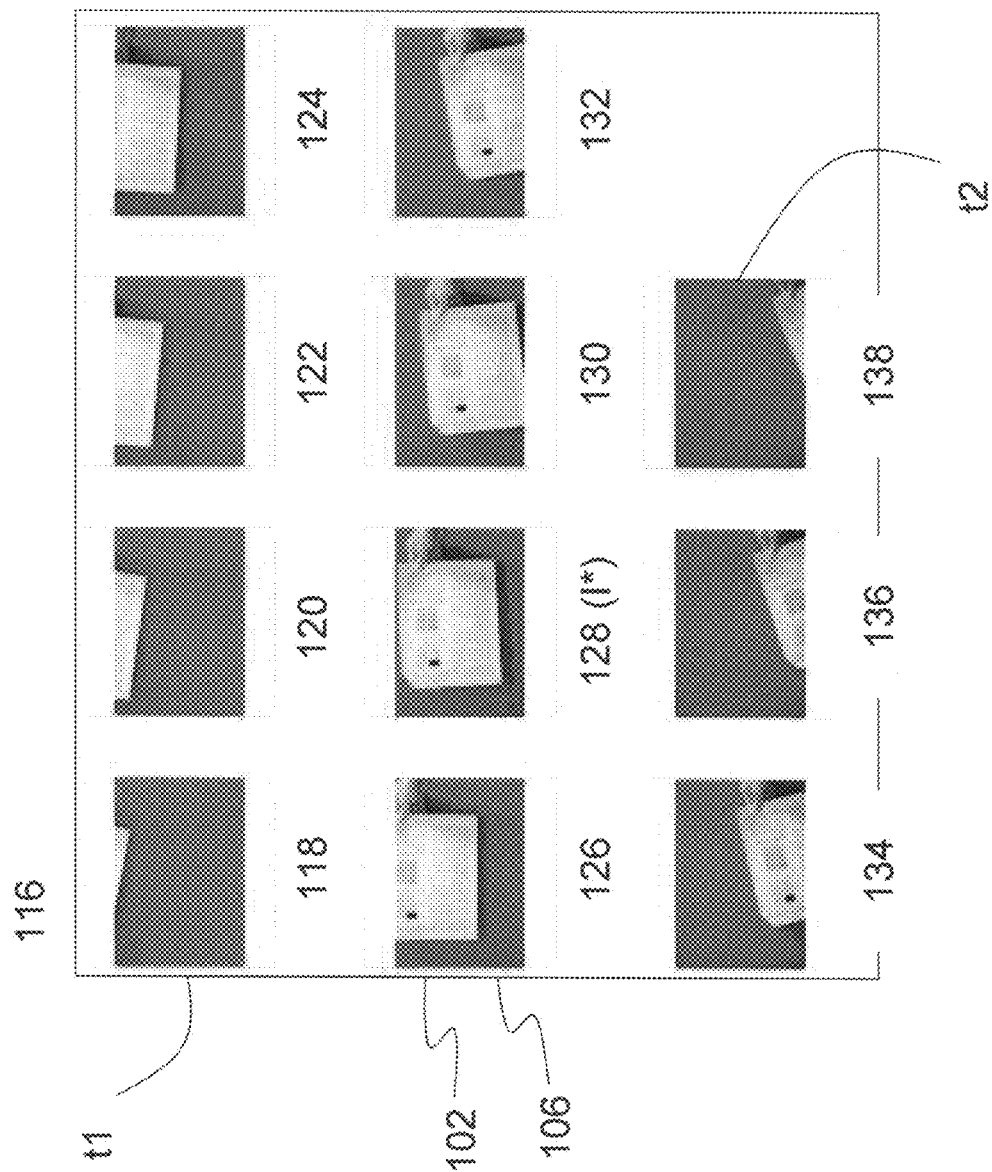
FIG. 2 depicts a sub-sequence of images corresponding to a single page of a document as the page is passed in front of the image capture device, according to one embodiment of the invention.

An illustration of the interactive, semi-automatic system 100 is presented in FIG. 1, and the user interaction for scanning a page is illustrated in FIG. 2. The user scans a page 102 of a document by waving the pages 102 of the document one at a time pass an image capture device 104, such as a digital camera, video camera or webcam. The user can slide the page 102 on a colored background board 106, which can be placed vertically or horizontally. The image capture device 104 can be a digital camera shooting in "burst" mode, which takes a large number of pictures in short time frame, or a video camera that records video and therefore captures numerous images at a high frame rate. A sequence of images is recorded by the camera 104 during the scanning process. Once the user has passed one page 102 in front of the camera 104, the user can identify another page and pass the next page in front of the camera 104. The camera 104 continues to automatically capture images during the entire process, making it easy for the user to simply flip through the various pages of a document and pass them in front of the camera 104. The user need only activate the camera 104 at the beginning of the scanning process and deactivate the camera 104 at the end of the scanning process, thereby maximizing the time for the user to present the parts of the document and minimizing the need to control the camera 104. Instead of passing the page in front of the camera, the user may also pass the camera over the pages.

The camera then communicates with a computer 108 containing a processor (not shown) and a memory 110 and transmits a sequence of images that was captured during the scanning process to the computer 108. A display 112 provides feedback to the user. The computer 108 can optionally be connected to a network 114 for transmitting or receiving sequences of images from other locations. From the sequence of recorded images, sub-sequences 116 are automatically detected, each representing images of a single page 102 as it passes in front of the camera 104, as shown in FIG. 2.

Figure 3:
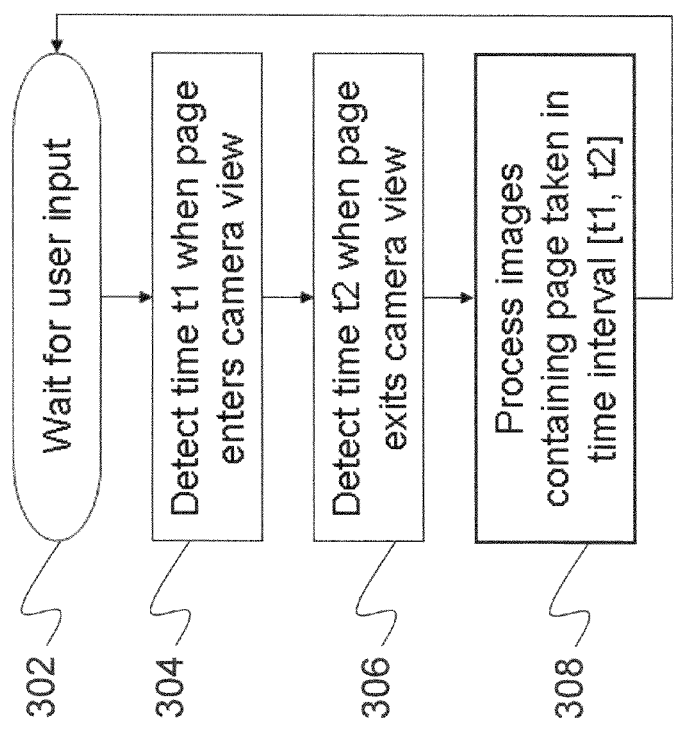
FIG. 3 depicts a method of interactive, semi-automatic document scanning, according to one embodiment of the invention.

The process for scanning one page of a document using the semi-automatic, interactive system is depicted in FIG. 3. In step 302, the system waits for input by the user indicating that the scanning is about to begin, such as activation of the camera 104 or a prompt on the computer 108. In step 304, the system detects a time, t1, when a page enters the view of the camera, as depicted by image 118. As the user passes the page 102 in front of the camera 104, a sequence of images 118-138 is captured. At step 306, the system detects a time, t2, when the page exits the view of the camera 104, as depicted by image 138. The system repeats the process for each page of the document, capturing all the pages as a total sequence, and then dividing the total sequence into sub-sequences 116 corresponding to each page of the document. At step 308, the images that pertain to each sub-sequence, in this case those images between t1 and t2 (images 118-138) are then processed by an image processor (not shown) located at computer 108. The steps involved in image processing 308 are detailed below.

Figure 4:
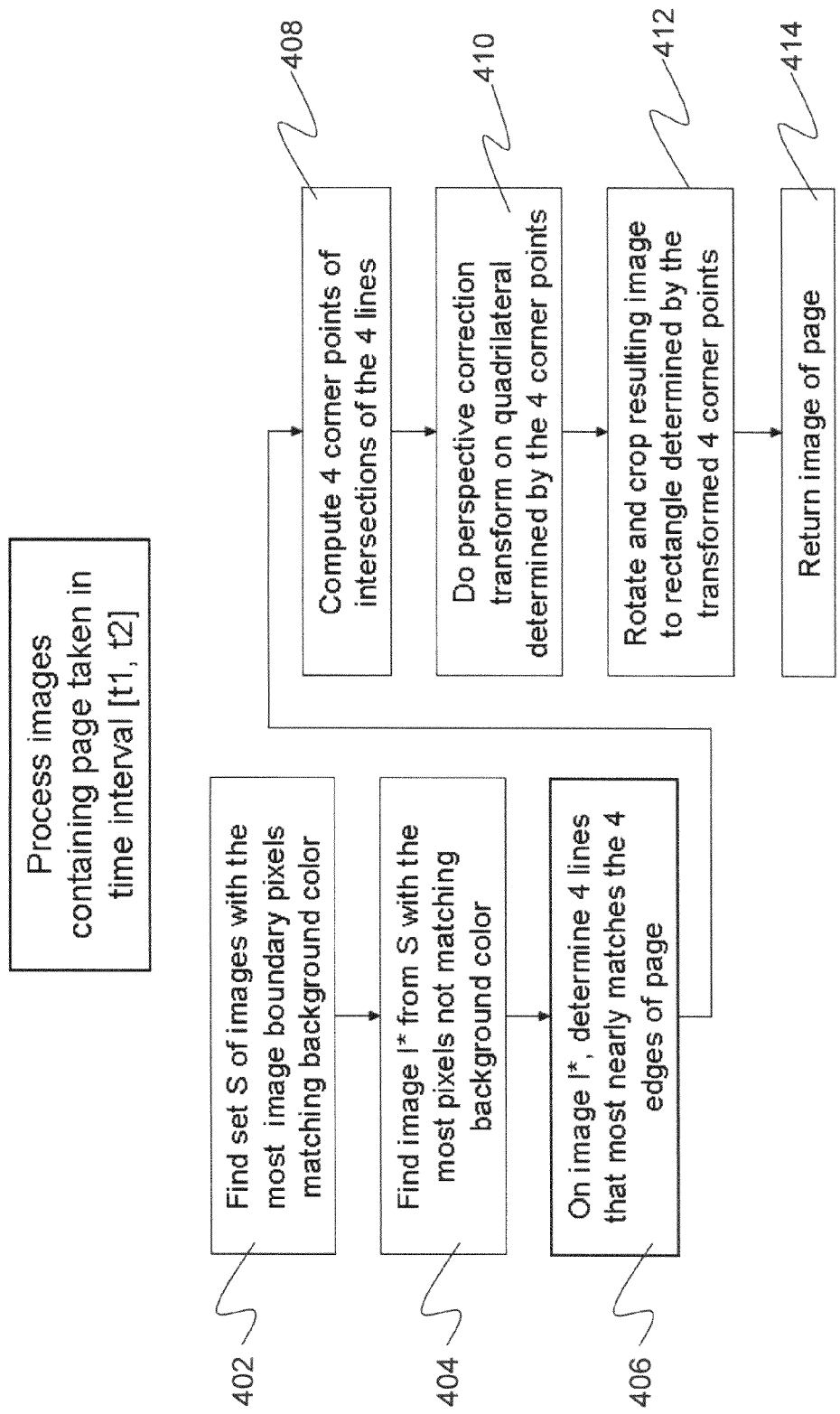
FIG. 4 depicts a method of processing a sub-sequence of images to select the preferable image of each scanned page in the document, according to one embodiment of the invention.
Figure 6:
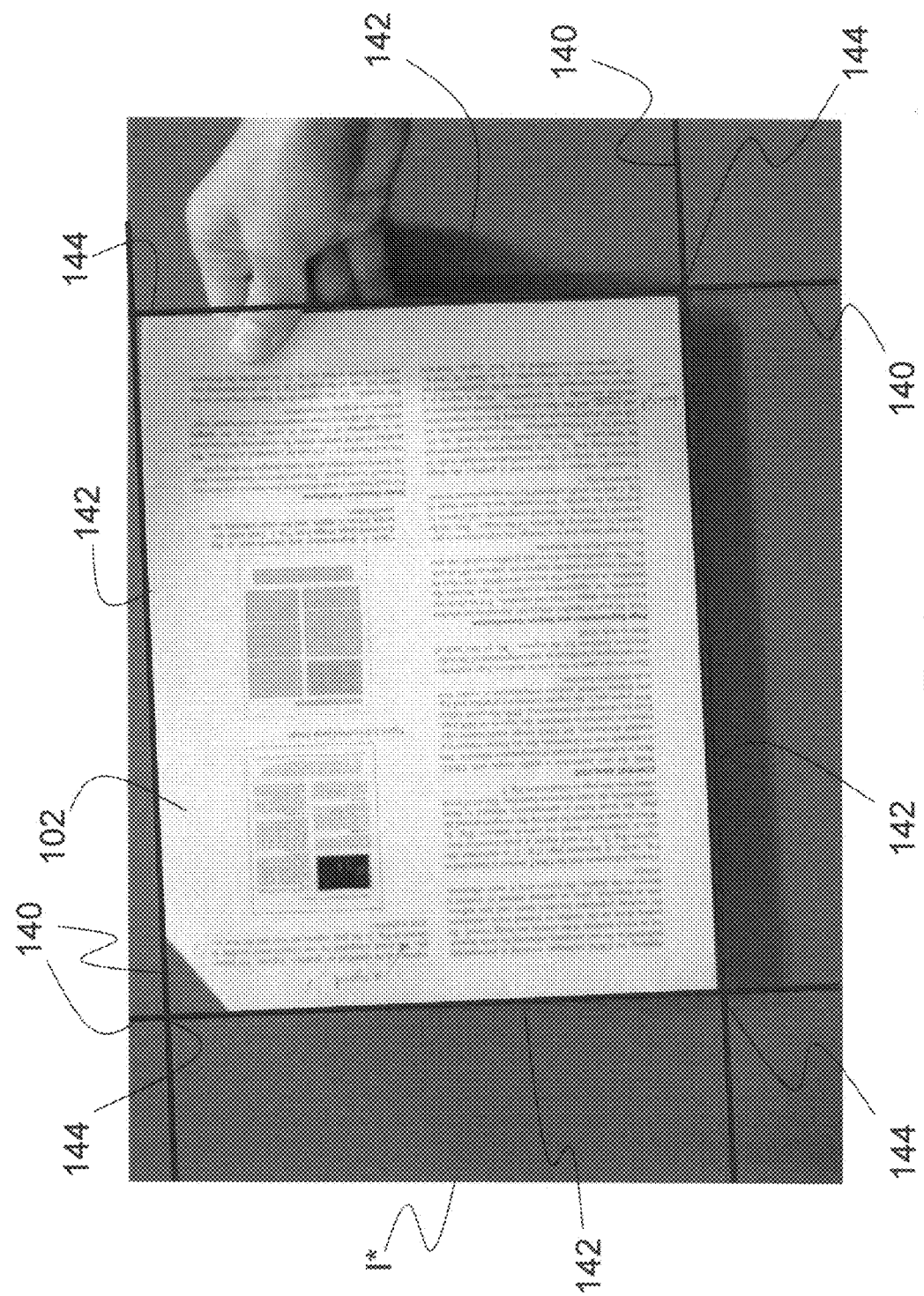
FIG. 6 depicts an image of the scanned page where the image processor has determined the edges and corners of the document, according to one embodiment of the invention.
Figure 7A:
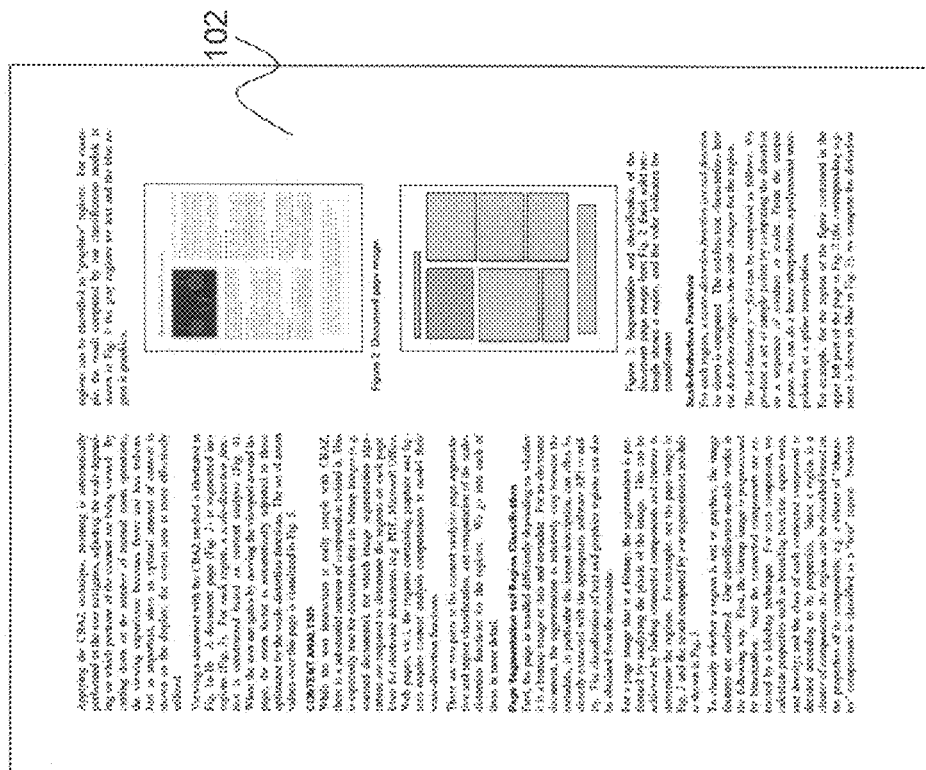
FIG. 7A depicts an image of the page of a document after the image processor has performed perspective correction, cropped and rotated the page, according to one embodiment of the invention.

The sub-سequences of images 116 pertaining to each page 102 of the scanned document are then processed by the image processor to select the best image of each page 102 from each sub-sequence 116 in order to create the best digital copy of the scanned document, a process further illustrated in FIG. 4. For each sub-sequence containing a page, the image I* that has the best view of the page is determined. In step 402, the image processor finds a set of images 118-138 with the most image boundary pixels matching the background color. This step 402 will identify the images where the page 102 is in full view of the camera such that the boundaries of the image only include the background color (for example, image 128). In step 404, an image I* is selected based on whichever image has the most pixels not matching the background 106 color. Again, the image with the most pixels not matching the background is likely the image with most, if not all, of the page 202 in view. As before, image 128 is likely the best candidate for image I*. A color background board 106 is not essential, but does make the step of distinguishing the page from the background easier and more effective, especially when the background color is different than the color of the pages being scanned. Next, in step 406, the image processor determines four lines that most closely match the four edges of the page, as illustrated by the lines 140 that correspond to the edges 142 of the page 102 in FIG. 6. In step 408, the corner points 144 of the page 102 are found based on the intersections of the lines 140. In step 410, a perspective correction transform is applied to the quadrilateral determined by these corner points, using software such as that found in the OpenCV library (http://opencvlibrary.sourceforge.net, last accessed Feb. 5, 2009). In step 412, the image I* is rotated and cropped. Finally, the resulting best image 146 is returned in step 414, as illustrated in FIG. 7A.

Figure 7B:
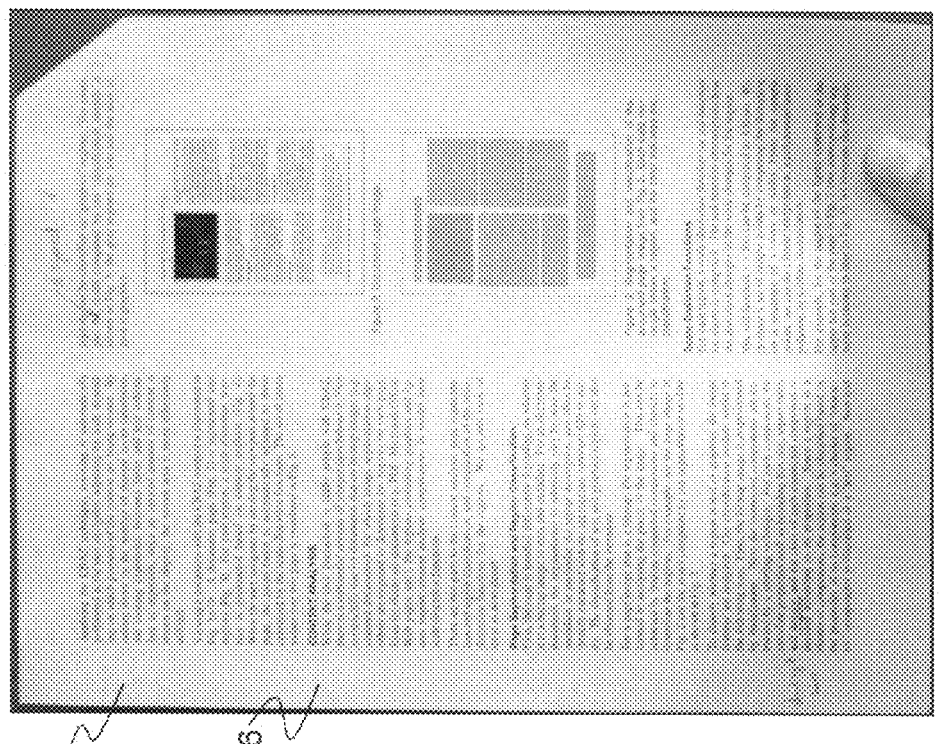
FIG. 7B depicts an illustration of an original digital image of the page depicted in FIG. 7A, according to one embodiment of the invention.

The original digital image of the same page 102 is shown in FIG. 7B to illustrate the accuracy with which the interactive, semi-automatic scanning system is able to effectively and accurately scan a page.

The process described above and shown in FIGS. 3 and 4 is then repeated for each page in the document, after which the document can be digitally assembled and displayed to the user on the display 112.

Figure 5:
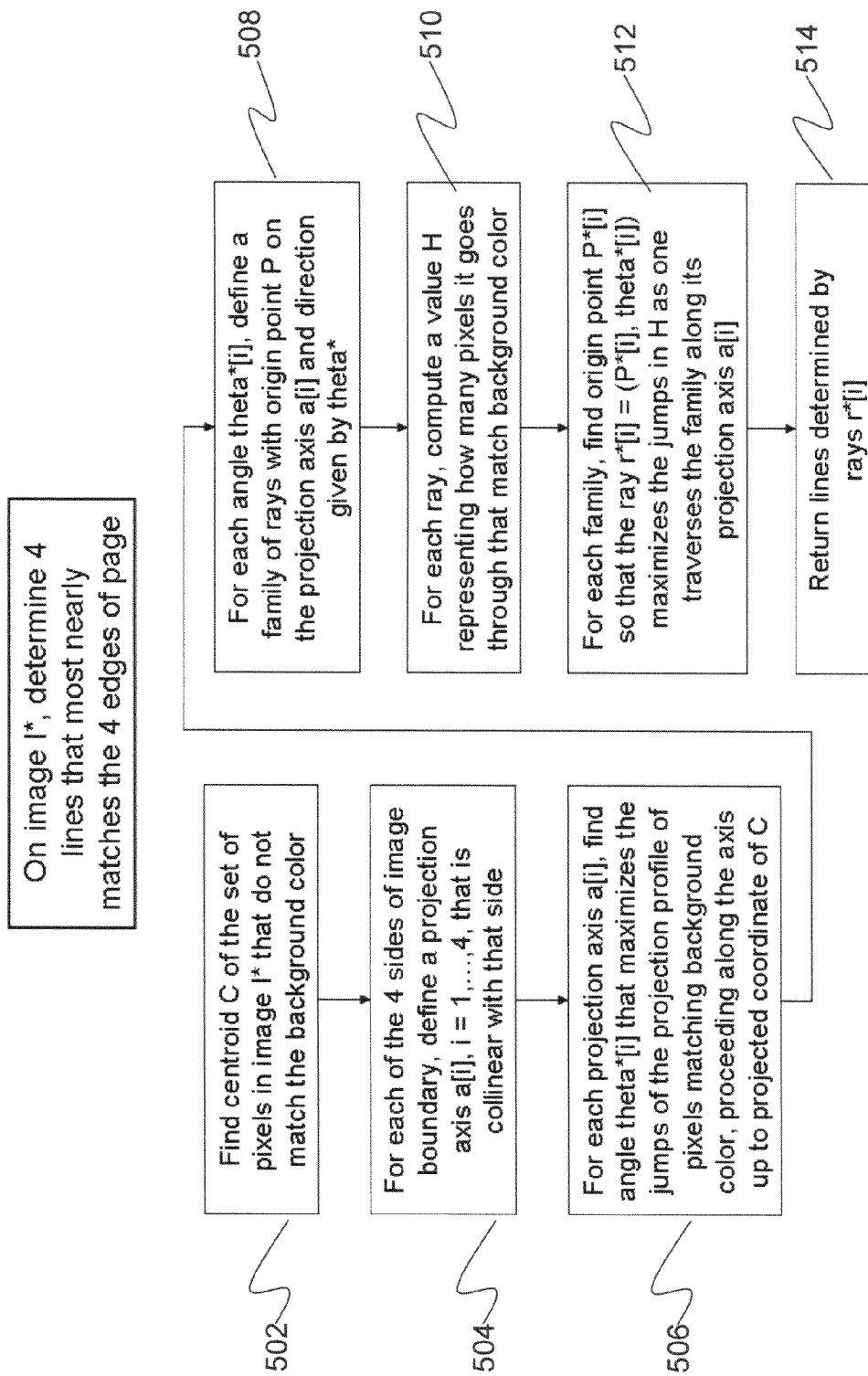
FIG. 5 depicts a method of determining the edges of the page in a scanned image, according to one embodiment of the invention.

In finding the corner points 144 of the page 102 in the image I*, the idea is to analyze the projection profiles of the set of pixels that match the background color, as is further described by the flow diagram in FIG. 5. The first step, 502, is to find the centroid C on the set of pixels in image I* that do not match the background color 106. Next, in step 504, a projection axis a, i=1, . . . , 4, is defined for each of the four sides of the image boundary, where the projection axis is collinear with its side. Next, in step 506, an angle theta* is determined for each projection axis a[i] that maximizes the jumps of the projection profile of pixels matching the background color, proceeding along the axis up to projected coordinate of C. In step 508, for each angle theta*[i], a family of rays with origin point P on the projection axis a[i] and direction given by theta* is defined. Then, in step 510, a value H is computed representing how many pixels each ray goes through that matches the background color. Finally, in step

512, the origin point P*[i] is found for each family so that the ray r*[i]=(P*[i], theta*[i]) maximizes the jumps in H as one traverses the family along its projection axis a[i]. In step 514,the lines 140 determined by rays r*[i] are created on the image I*, as shown in FIG. 6.

The inventive system was compared with known scanning methods and with a system using a digital camera to take photos of a document. Using a digital camera, the user has to move back and forth from operating the camera to turning and placing a page on the table. With desktop flatbed scanners (e.g. Canon PIXMA), for each page, the user has to lift the top up, place a page on the scanner bed, and press a button. In contrast, the interactive system described herein eliminates the back and forth movement between handling the document and operating the camera or scanner.

Some desktop scanners are equipped with a paper feeder which is adequate for a stack of loose pages in good condition but which cannot handle a stapled document, old papers in poor condition, or non-traditional document types, styles, or formats that will cause paper jams in most systems.

In terms of image quality, testing of the inventive system demonstrates that it is possible to reconstruct a good quality image from the sequence of recorded images from the user waving a page. A test of the inventive method was conducted using two digital cameras (Nikon D40 and Nikon D300, Nikon Corp., Japan) shooting in burst mode at 2.5 and 6 frames per second, respectively. After processing the images according to the methods and algorithms described above and in the flow diagrams in FIGS. 3, 4 and 5, the output images were processed with OmniPage OCR software (Nuance Communications, Inc., Burlington, Mass.). The word accuracy rates for the D40 and D300 are 79% and 98%, respectively.

Image Enhancement

Image enhancement of the selected and processed images might be needed when capturing condition is not ideal (document not well-lit, drastic hand waving motion). Images recorded by the inventive system are most likely to be blurred due to the motion of the page in front of the camera, so techniques to correct motion blur and estimate motion between frames are useful. Image enhancement can either happen before document-page construction or after.

Image enhancement procedures compose of image cleanup, image deblurring or super-resolution, although one skilled in the art will appreciate that there are numerous image enhancement methods and techniques. For image cleanup, issues include noise and uneven illumination. One non-limiting example of image cleanup is to calibrate the system with test images, deduce the adjustments for correcting the test images, and apply the adjustments when processing other pages. Super-resolution is a technique to enhance the resolution of an image by using multiple low-resolution images to create one higher resolution image, and is particularly advantageous in the system described above, where numerous images of a single page are created.

Another method of image enhancement is image deblurring by tracking, which uses motion estimation between images along with other relevant data to estimate and correct motion blur. Two image blurring scenarios will be described: a first is when the document page has been blurred by a hand-motion at a constant-speed; the second is when the document page has been blurred by a hand-motion with accelerating speed. Unlike conventional methods, the described image deblurring methods specifically use motion-estimation techniques, camera burst rate, and camera shutter-speed to estimate the page motion in order to reconstruct the un-blurred document page.

Figure 8:
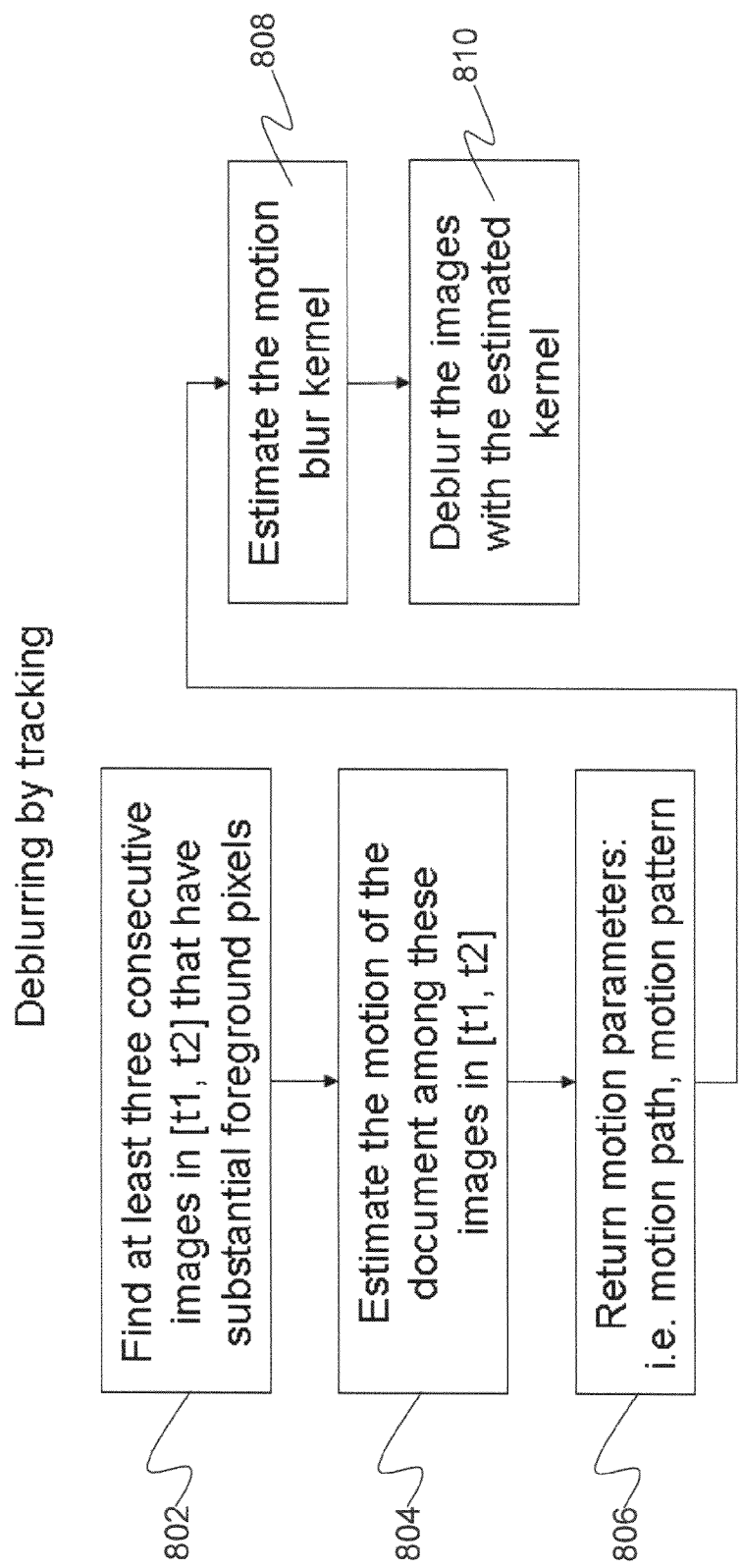
FIG. 8 depicts a method of image enhancement to deblur an image by estimating the motion blur of the page in the image, according to one embodiment of the invention.
Figure 9:
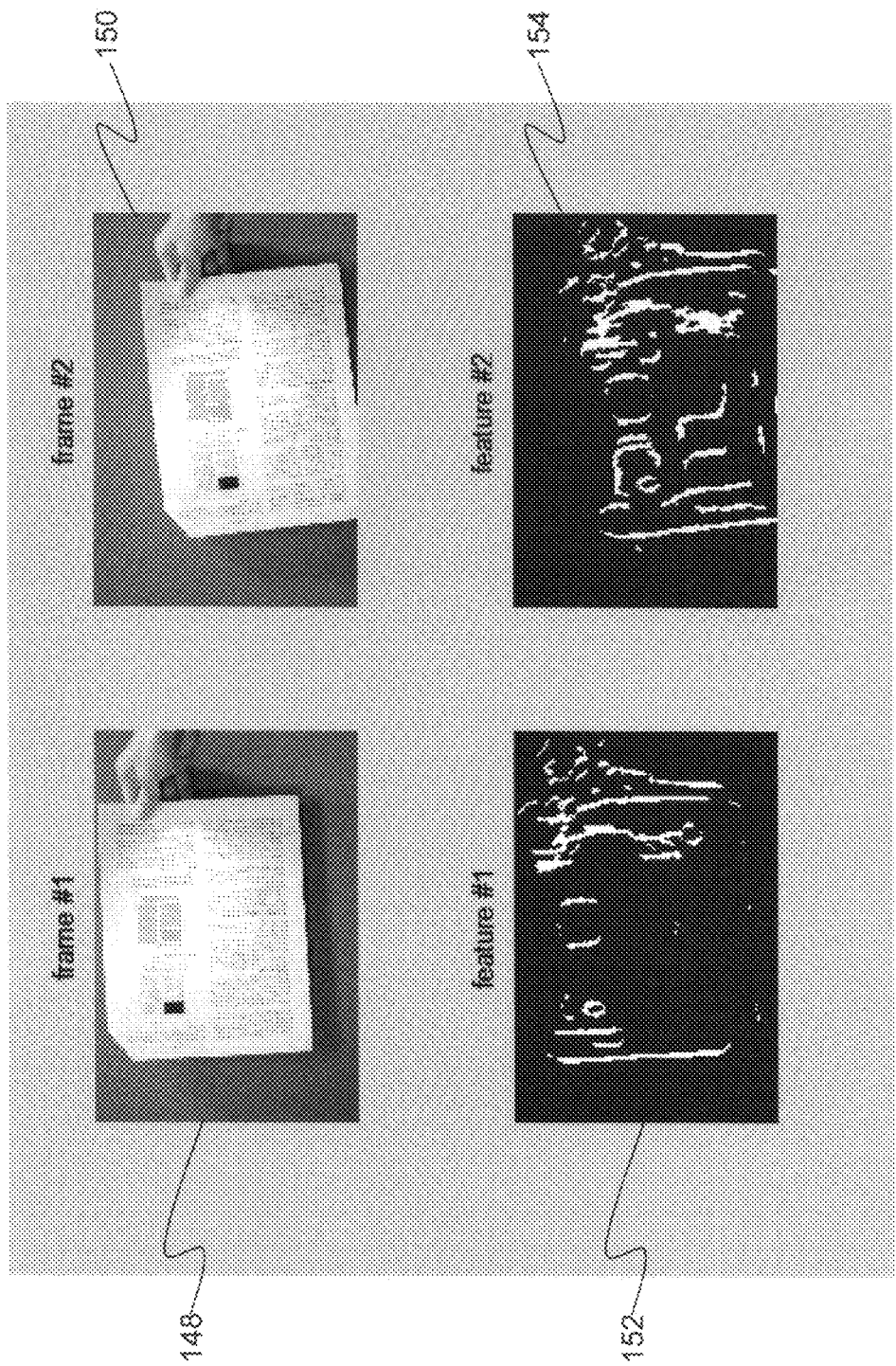
FIG. 9 depicts a comparison of scanned images where edge detection features are used to match images of a document in consecutive images.
Figure 10:
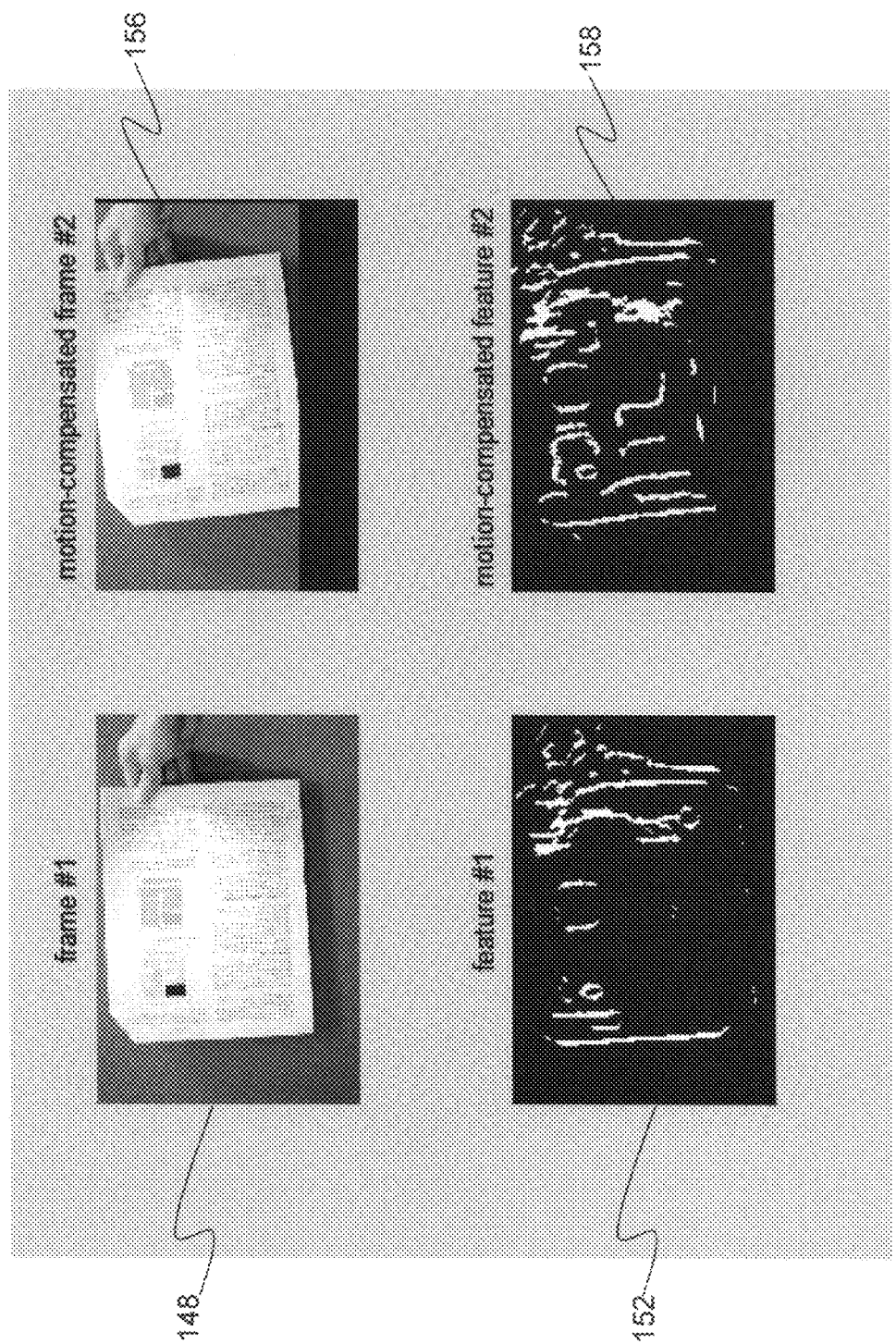
FIG. 10 depicts a comparison of a first scanned image with a second, motion-compensated image as a result of the edge detection and matching, according to one embodiment of the invention.

The flow diagram in FIG. 8 provides an overview of a method for deblurring by tracking, beginning with step 802, of identifying at least three consecutive images in a subsequence of images that have substantial foreground pixels. Although motion of the page between images can be estimated with less than three images, the use of three allows for the estimation of acceleration in the motion, which is described in further detail below. In step 804, the motion of the page between the selected at least three images is estimated. In one embodiment, edge features of the page are used to estimate the motion between images and perform matching between consecutive frames, as illustrated in FIGS. 9 and 10. In FIG. 9, two consecutively-recorded images 148 and 150 are processed to determine their edge features, as illustrated in their respective edge feature images 152 and 154. In FIG. 10, the edge features of edge feature image 152 and 154 are matched, as shown in the motion-corrected image 156 and corresponding edge feature image 158. Once the matching takes place, the estimated motion across the frames can be calculated in step 806. Additional parameters are also provided in step 806, such as the shutter speed and burst rate of the camera 104. After estimating the motion across frames, the motion blur in each image can be sampled in step 808, given the shutter-speed and camera burst rate information. For example, if it is assumed that the user's hand was passing the page 102 in front of the camera 104 at a constant speed, the motion blur in each image is:

$$(\text{motion across frames})*(\text{burst rate/shutter-speed}).$$

The resulting calculation provides the width of pixel-blur, otherwise known as the kernel width. In step 810, the estimated kernel width can be used to deblur the image using deconvolution. Note that dense-matching methods such as optical flows on document images give bad results due to the characteristic of fixed letter-shape in documents.

Figure 11B:
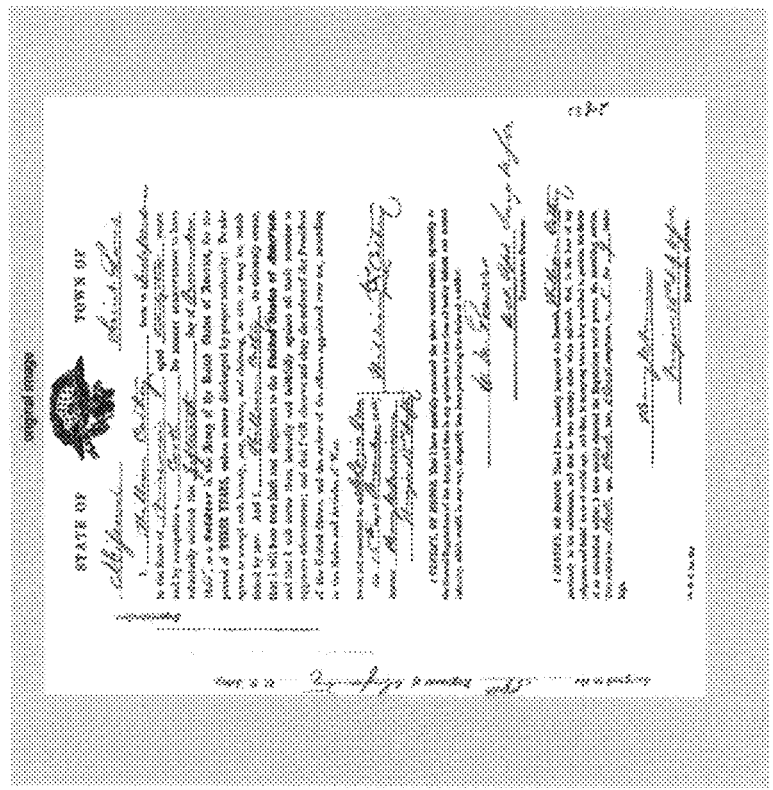
FIG. 11B depicts an illustration of a blurred image of a page from a scanned sub-sequence of images, according to one embodiment of the invention.
Figure 11A:
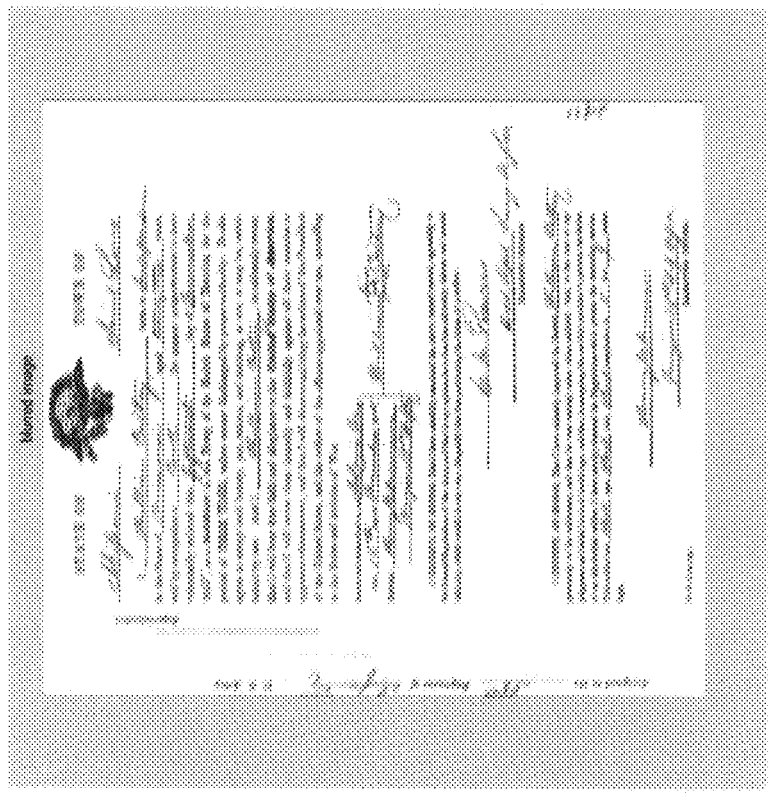
FIG. 11A depicts a photographic illustration of a page in a document before it is scanned using the inventive system, according to one embodiment of the invention.
Figures 12A, 12B, 12C:
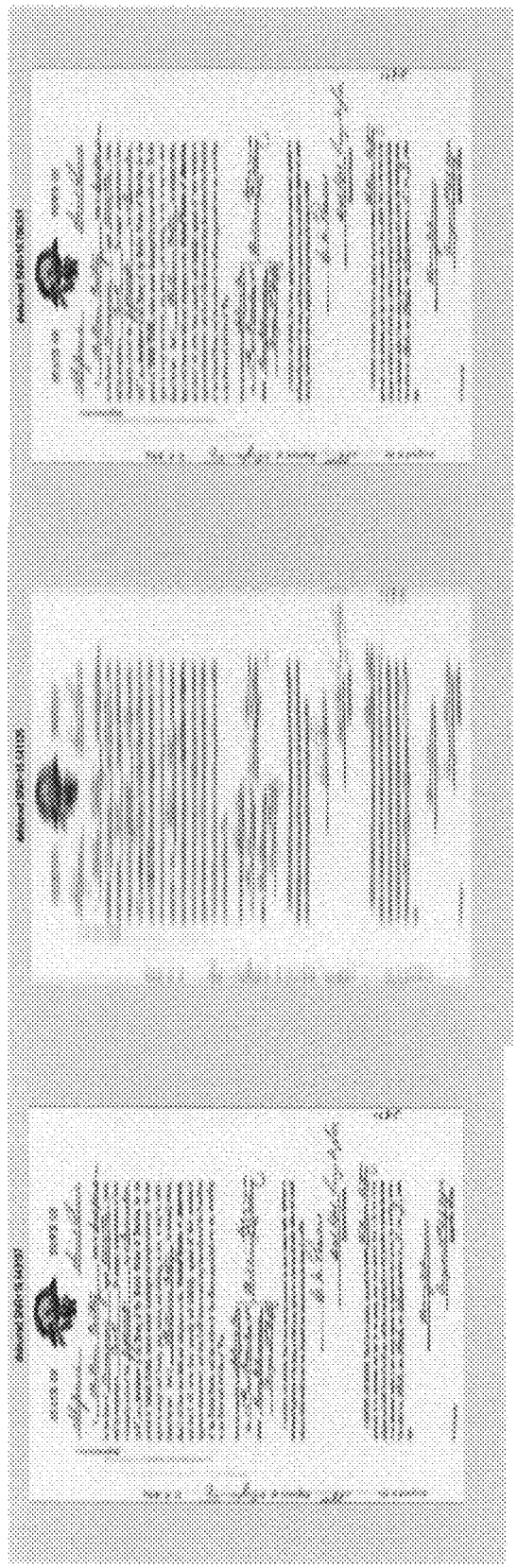
FIGS. 12A, 12B and 12C depict images that have been deblurred based on different estimations of motion, according to one embodiment of the invention.

The above-described image deblurring method is illustrated by the pages shown in FIGS. 11A and 11B and 12A, 12B and 12C. FIG. 11A shows the original image prior to scanning; FIG. 11B is the image being motion blurred by a hand motion with constant-speed. Without knowing the width of the pixel-blur (the kernel width), guessing the width of pixel-blur results in poor results—shown by the low signal-to-noise ratio ("SNR") of 16.649197 in FIG. 12A and 15.541125 FIG. 12B, where the kernel width is estimated to be 2 and 24, respectively. When the correct kernel width, 6, is estimated, the optimal result is achieved, as illustrated by the image in FIG. 12C, with a SNR of 16.706351.

Figure 13A:
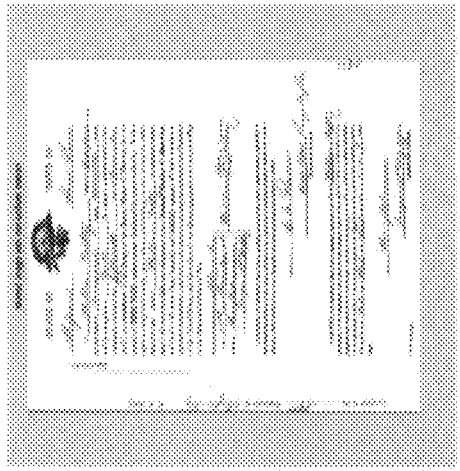
FIG. 13A depicts a photographic illustration of a page in a document before it is scanned using the inventive system, according to one embodiment of the invention.
Figure 13B:
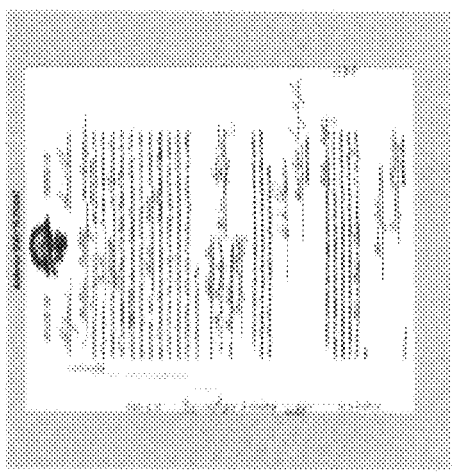
FIGS. 13B, 13C and 13D depict images that have been deblurred based on different estimations of motion and accelerating motion, according to one embodiment of the invention.
Figure 13C:
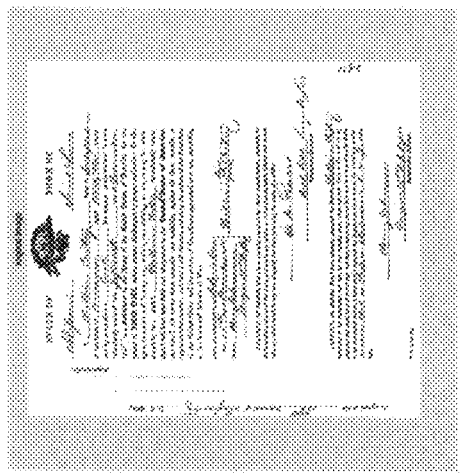
Figure 13D:
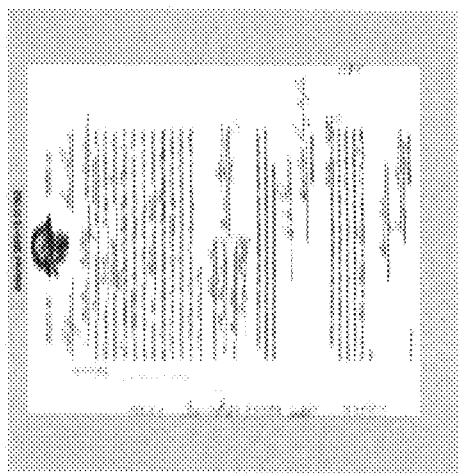

When the blur is due to accelerating motion during the scanning process, even with the correct estimate of the kernel width, it is difficult to reconstruct a good image without knowing the accelerating motion pattern. FIG. 13A shows the original image before scanning, while FIG. 13B shows the image being motion blurred by a hand motion with accelerating speed. FIG. 13C illustrates the above-described process of image deblurring that does not account for the acceleration--resulting in an SNR of 16.051959. However, estimating the right motion by calculating the acceleration pattern between multiple frames gives a better result, as illustrated by the image in FIG. 13D, with a SNR of 16.250047. In the current embodiment, the acceleration is estimated by computing the second derivative using the sampled points and the frame rate.

Due to the typical document characteristics of two-tone (black and white) and fixed letter-shapes, it's more challenging to correct the artifact from motion blur than to correct the same motion effect from a natural image.

Exemplary Computer System

Figure 14:
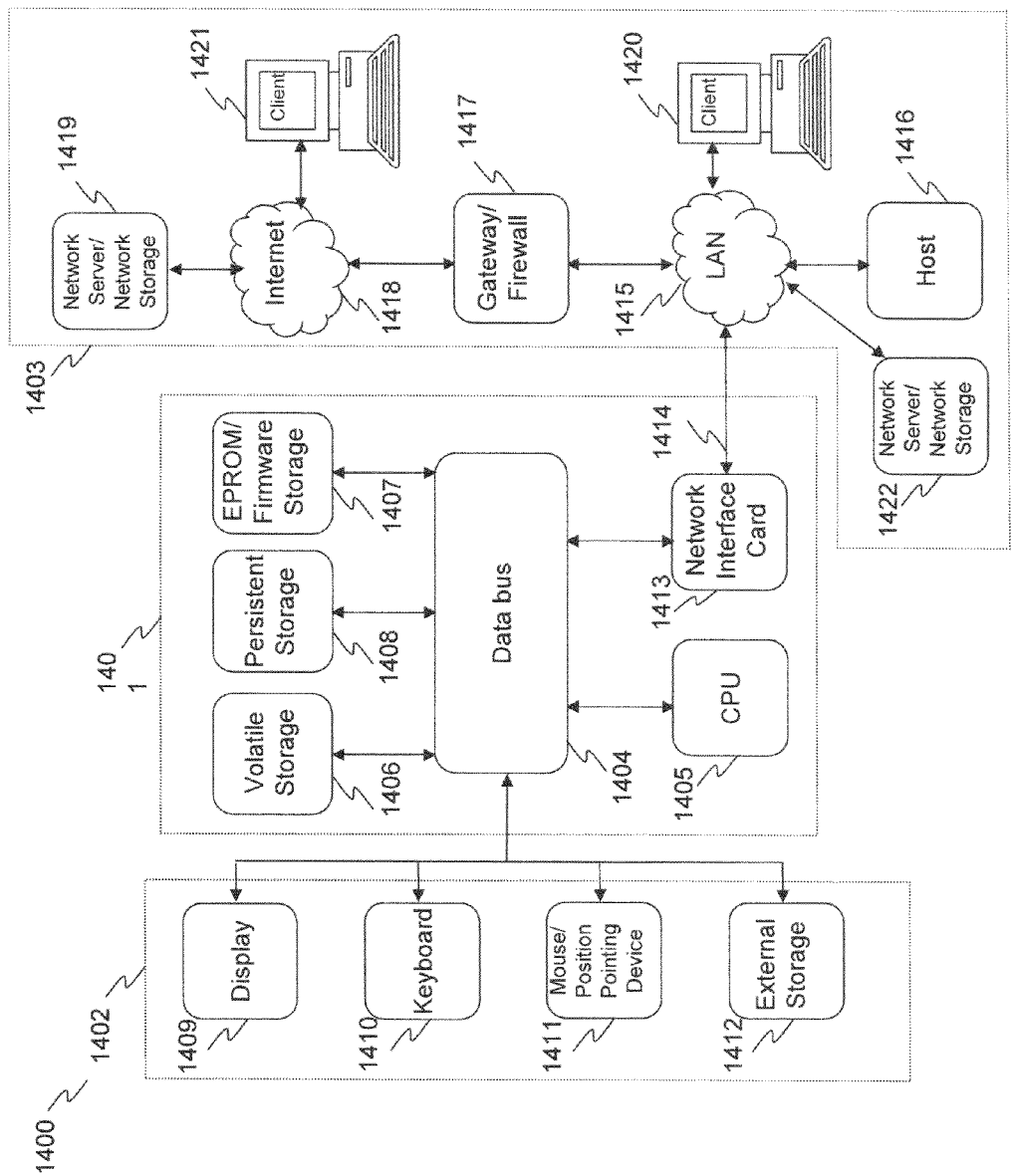
FIG. 14 illustrates an exemplary embodiment of a computer platform upon which the inventive system may be implemented.

FIG. 14 is a block diagram that illustrates an embodiment of a computer/server system 1400 upon which an embodiment of the inventive methodology may be implemented. The system 1400 includes a computer/server platform 1401, peripheral devices 1402 and network resources 1403.

The computer platform 1401 may include a data bus 1404 or other communication mechanism for communicating information across and among various parts of the computer platform 1401, and a processor 1405 coupled with bus 1401 for processing information and performing other computational and control tasks. Computer platform 1401 also includes a volatile storage 1406, such as a random access memory (RAM) or other dynamic storage device, coupled to bus 1404 for storing various information as well as instructions to be executed by processor 1405. The volatile storage 1406 also may be used for storing temporary variables or other intermediate information during execution of instructions by processor 1405. Computer platform 1401 may further include a read only memory (ROM or EPROM) 1407 or other static storage device coupled to bus 1404 for storing static information and instructions for processor 1405, such as basic input-output system (BIOS), as well as various system configuration parameters. A persistent storage device 1408, such as a magnetic disk, optical disk, or solid-state flash memory device is provided and coupled to bus 1401 for storing information and instructions.

Computer platform 1401 may be coupled via bus 1404 to a display 1409, such as a cathode ray tube (CRT), plasma display, or a liquid crystal display (LCD), for displaying information to a system administrator or user of the computer platform 1401. An input device 1420, including alphanumeric and other keys, is coupled to bus 1401 for communicating information and command selections to processor 1405. Another type of user input device is cursor control device 1411, such as a mouse, a trackball, or cursor direction keys for communicating direction information and command selections to processor 1404 and for controlling cursor movement on display 1409. This input device typically has two degrees of freedom in two axes, a first axis (e.g., x) and a second axis (e.g., y), that allows the device to specify positions in a plane.

An external storage device 1412 may be connected to the computer platform 1401 via bus 1404 to provide an extra or removable storage capacity for the computer platform 1401. In an embodiment of the computer system 1400, the external removable storage device 1412 may be used to facilitate exchange of data with other computer systems.

The invention is related to the use of computer system 1400 for implementing the techniques described herein. In an embodiment, the inventive system may reside on a machine such as computer platform 1401. According to one embodiment of the invention, the techniques described herein are performed by computer system 1400 in response to processor 1405 executing one or more sequences of one or more instructions contained in the volatile memory 1406. Such instructions may be read into volatile memory 1406 from another computer-readable medium, such as persistent storage device 1408. Execution of the sequences of instructions contained in the volatile memory 14014 causes processor 1405 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1405 for execution. The computer-readable medium is just one example of a machine-readable medium, which may carry instructions for implementing any of the methods and/or techniques described herein. Such a medium may take many forms, including but not limited to, non-volatile media, and volatile media. Non-volatile media includes, for example, optical or magnetic disks, such as storage device 1408. Volatile media includes dynamic memory, such as volatile storage 1406.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 1405 for execution. For example, the instructions may initially be carried on a magnetic disk from a remote computer. Alternatively, a remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on the data bus 1404. The bus 1404 carries the data to the volatile storage 1406, from which processor 1405 retrieves and executes the instructions. The instructions received by the volatile memory 1406 may optionally be stored on persistent storage device 1408 either before or after execution by processor 1405. The instructions may also be downloaded into the computer platform 1401 via Internet using a variety of network data communication protocols well known in the art.

The computer platform 1401 also includes a communication interface, such as network interface card 1413 coupled to the data bus 1404. Communication interface 1413 provides a two-way data communication coupling to a network link 1414 that is connected to a local network 1415. For example, communication interface 1413 may be an integrated services digital network (ISDN) card or a modem to provide a data communication connection to a corresponding type of telephone line. As another example, communication interface 1413 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 1413 sends and receives electrical, electromagnetic or optical signals that carry digital data streams representing various types of information.

Network link 1413 typically provides data communication through one or more networks to other network resources. For example, network link 1414 may provide a connection through local network 1415 to a host computer 1416, or a network storage/server 1417. Additionally or alternatively, the network link 1413 may connect through gateway/firewall 1417 to the wide-area or global network 1418, such as an Internet. Thus, the computer platform 1401 can access network resources located anywhere on the Internet 1418, such as a remote network storage/server 1419. On the other hand, the computer platform 1401 may also be accessed by clients located anywhere on the local area network 1415 and/or the Internet 1418. The network clients 1420 and 1421 may themselves be implemented based on the computer platform similar to the platform 1401.

Local network 1415 and the Internet 1418 both use electrical, electromagnetic or optical signals that carry digital data streams. The signals through the various networks and the signals on network link 1414 and through communication interface 1413, which carry the digital data to and from computer platform 1401, are exemplary forms of carrier waves transporting the information.

Computer platform 1401 can send messages and receive data, including program code, through the variety of network(s) including Internet 1418 and LAN 1415, network link 1414 and communication interface 1413. In the Internet example, when the system 1401 acts as a network server, it might transmit a requested code or data for an application program running on client(s) 1420 and/or 1421 through Internet 1418, gateway/firewall 1417, local area network 1415 and communication interface 1413. Similarly, it may receive code from other network resources.

The received code may be executed by processor 1405 as it is received, and/or stored in persistent or volatile storage devices 1408 and 1406, respectively, or other non-volatile storage for later execution. In this manner, computer system 1401 may obtain application code in the form of a carrier wave.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Although various representative embodiments of this invention have been described above with a certain degree of particularity, those skilled in the art could make numerous alterations to the disclosed embodiments without departing from the spirit or scope of the inventive subject matter set forth in the specification and claims. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. Also, various aspects and/or components of the described embodiments may be used singly or in any combination in the computerized scanning system. It is intended that all matter contained in the above description or shown in the accompanying drawings shall be interpreted as illustrative only and not limiting.

What is claimed is:

1. A system for scanning a document, the system comprising:
   a) an image capture device configured to record a sequence of images of at least one page of the document as a user passes the at least one page in front of the image capture device relatively; and
   b) an image processor embodied on a computer with a processor and a memory that receives the recorded sequence of images and detects a sub-sequence of images for each page of the document,
   wherein the image processor detects the sub-sequence of images by:
      identifying a background pixel value,
      determining, for each image in the recorded sequence of images, a background pixel value number, which is a number of pixels having a pixel value equal to the background pixel value and
      selecting, as the sub-sequence of images, one or more images wherein the selected one or more images have the background pixel value number that is less than or equal to a threshold number of pixels having a pixel value equal to the background pixel value, and
   wherein the image processor selects a preferable image of each page from the sub-sequence of images to create a digital copy of the document.

2. The system of claim 1, wherein the image processor selects the preferable image of each page from the sub-sequence of images by finding the image based on the image boundary pixels matching the background and determining corner points of the page.

3. The system of claim 2, wherein the image processor is further configured to perform perspective correction on the preferable image of each page of the document.

4. The system of claim 3, wherein the image processor is further configured to crop and rotate the preferable image of each page of the document.

5. The system of claim 4, further comprising a color background board for the image capture device to point at while the sequence of images of the document are being recorded.

6. The system of claim 5, wherein the image processor is further configured to perform image deblurring on the preferable image from each page of the document.

7. The system of claim 6, wherein the image processor is further configured to perform image cleanup on the preferable image from each page of the document.

8. A method for scanning a document, comprising the steps of:
   a) recording a sequence of images of at least one page of the document as a user passes the at least one page in front of an image capture device;
   b) detecting a sub-sequence of images for each page of the document by:
      identifying a background pixel value,
      determining, for each image in the recorded sequence of images, a background pixel value number, which is a number of pixels having a pixel value equal to the background pixel value and
      selecting, as the sub-sequence of images, one or more images wherein the selected one or more images have the background pixel value number that is less than or equal to a threshold number of pixels having a pixel value equal to the background pixel value, and;
   c) selecting the preferable image of each page of the document from the sub-sequence of images; and
   d) creating a digital copy of the document by combining the preferable image of each page of the document into a single digital document.

9. The method of claim 8, further comprising performing page edge detection on each image in the sub-sequence of images in order to determine the preferable image of each page of the document.

10. The method of claim 9, further comprising performing perspective correction on the preferable image of each page of the document.

11. The method of claim 10, further comprising cropping and rotating the preferable image of each page of the document.

12. The method of claim 11, further comprising providing a color background board for the image capture device to point at while the sequence of images of the document are being recorded.

13. The method of claim 12, further comprising performing image deblurring on the preferable image from each page of the document.

14. The method of claim 13, further comprising performing image cleanup on the preferable image from each page of the document.

15. The system of claim 1, wherein the identifying the background pixel value comprises detecting the background pixel value based on a plurality of images from the sequence of images.

16. The system of claim 1, wherein the identifying the background pixel value comprises receiving a pre-specified background pixel value and wherein the image processor uses the received, pre-specified background pixel value in the determining, for each image in the recorded sequence of images, the background pixel value number.

17. The method of claim 8, wherein the identifying the background pixel value comprises detecting the background pixel value based on a plurality of images from the sequence of images.

18. The method of claim 8, wherein the identifying the background pixel value comprises receiving a pre-specified background pixel value and wherein the received, pre-specified background pixel value is used in the determining, for each image in the recorded sequence of images, the background pixel value number.

* * * * *